(12) United States Patent
Gruber et al.

(10) Patent No.: US 7,849,977 B2
(45) Date of Patent: Dec. 14, 2010

(54) DISC BRAKE WITH OPTIMIZED CALIPER MOUNTING AND BRAKE LINING

(75) Inventors: Robert Gruber, Ebersberg (DE); Wlodzimierz Macke, Olching (DE); Dietmar Knoop, Ebenhausen (DE); Georg Kempinger, Munich (DE); Wolfgang Pritz, Aldersbach (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 222 days.

(21) Appl. No.: 11/785,567

(22) Filed: Apr. 18, 2007

(65) Prior Publication Data

US 2008/0029351 A1    Feb. 7, 2008

Related U.S. Application Data

(63) Continuation of application No. PCT/EP2005/011144, filed on Oct. 17, 2005.

(30) Foreign Application Priority Data

Oct. 18, 2004   (DE)   ........................ 10 2004 050 667

(51) Int. Cl.
*F16D 65/092*   (2006.01)

(52) U.S. Cl. .................................... 188/72.5; 188/73.39

(58) Field of Classification Search ... 188/73.35–73.47, 188/250 B, 250 G, 251 M
See application file for complete search history.

(56) References Cited

U.S. PATENT DOCUMENTS

| 3,190,397 | A |   | 6/1965  | Sudres |               |
|-----------|---|---|---------|--------|---------------|
| 3,346,076 | A |   | 10/1967 | Hayes  |               |
| 3,388,774 | A | * | 6/1968  | Burnett | ............ 188/73.35 |
| 4,061,209 | A | * | 12/1977 | Gee et al. | ............ 188/73.36 |
| 4,305,483 | A |   | 12/1981 | Ikeda  |               |
| 4,685,543 | A | * | 8/1987  | Ziolkowski | ............ 188/73.1 |
| 4,732,242 | A |   | 3/1988  | Heibel |               |
| 5,343,985 | A |   | 9/1994  | Thiel et al. |         |
| 5,353,896 | A |   | 10/1994 | Baumgartner et al. | |
| 5,396,972 | A | * | 3/1995  | Grele  | ............ 188/250 G |
| 5,429,216 | A |   | 7/1995  | Kahr   |               |
| 5,439,078 | A | * | 8/1995  | Baumgartner et al. | .... 188/73.45 |
| 5,564,532 | A | * | 10/1996 | Baba et al. | ............ 188/73.39 |
| 5,582,273 | A |   | 12/1996 | Baumgartner et al. | |
| 5,931,267 | A | * | 8/1999  | Iwata et al. | ............ 188/73.45 |
| RE36,313  | E | * | 9/1999  | Kahr   | ............ 188/250 R |
| 6,182,801 | B1 |  | 2/2001  | Yoshida et al. |      |
| 7,201,258 | B2 | * | 4/2007 | Schog et al. | ............ 188/73.45 |

FOREIGN PATENT DOCUMENTS

| DE | 36 10 569 A1 | 10/1987 |
|----|--------------|---------|
| DE | 37 16 202 A1 | 11/1988 |

(Continued)

OTHER PUBLICATIONS

International Search Report dated Mar. 14, 2006 with English translation (ten (10) pages).

*Primary Examiner*—Christopher P Schwartz
(74) *Attorney, Agent, or Firm*—Crowell & Moring LLP (57) ABSTRACT

An optimized disc brake includes two fixed mountings and one free mounting, and an assembly space optimized brake carrier and corresponding brake lining for a reaction side of the disc brake are provided.

24 Claims, 9 Drawing Sheets

FOREIGN PATENT DOCUMENTS

| | | |
|---|---|---|
| DE | 41 26 339 A1 | 2/1993 |
| EP | 0 218 033 A1 | 4/1987 |
| EP | 0 375 956 A1 | 7/1990 |
| EP | 0 688404 | 9/1994 |
| FR | 1 440 107 | 5/1966 |
| GB | 1 500 907 | 2/1978 |
| JP | 59-73633 A | 4/1984 |
| JP | 8-189538 A | 7/1996 |
| WO | WO 91/19115 A1 | 12/1991 |
| WO | WO 2004/083667 A1 | 9/2004 |

* cited by examiner

$F_u$ - tangential force between disk and lining
$F$ - tangential force Fu is transmitted to the caliper
$R$ - reaction force directly on caliper guide, without bending

DISC BRAKE WITH OPTIMIZED CALIPER MOUNTING AND BRAKE LINING

CROSS-REFERENCE TO RELATED APPLICATIONS

This application is a continuation of PCT International Application No. PCT/EP2005/011144, filed on Oct. 17, 2005, which claims priority under 35 U.S.C. §119 to German Application No. 10 2004 050 667.1, filed Oct. 18, 2007, the entire disclosures of which are expressly incorporated by reference herein.

BACKGROUND AND SUMMARY OF THE INVENTION

The invention relates to a disc brake, in particular for a utility or commercial vehicle.

The invention is concerned, in particular, with a disc brake which is pneumatically and/or electromechanically actuated. The pneumatic drive device is, for example, a pneumatically actuated brake cylinder, which acts with a piston rod on the brake application unit, in particular on a rotary lever of the brake application unit. The electromechanical drive device may be an electric motor, which acts on the brake application device.

In general, disc brakes can, according to the selected force operating principle, be divided into two basic types: (i) force generation and wear adjustment on both sides of the brake disc, for example a hydraulic fixed caliper disc brake having an axially fixed brake disc and force generation on both sides of the brake disc, or (ii) force generation and wear adjustment on one side of the brake disc and transmission of the actuation force to the remote side as per the reaction principle, for example sliding caliper disc brakes, pivoting caliper disc brakes, and fixed caliper disc brakes having a displaceable brake disc.

Compressed-air-actuated disc brakes for heavy utility or commercial vehicles with wheel rim diameters of 15 inches and above conventionally utilize the reaction force principle since, on account of the restricted installation space conditions at the vehicle wheel, the arrangement of a compressed air actuating cylinder is possible only on the open side of the vehicle wheel, which side faces toward the inside of the vehicle. Constructions of this type are shown, for example, in DE 36 10 569 A1, DE 37 16 202 A1, EP 0 531 321 A1 (see here, in particular, the structure of the adjusters in the manner of rotary drives), and EP 0 688 404 A1.

Brake application devices of the type described here having an eccentrically mounted rotary lever and at least one, but preferably two, in particular axially variable-length pressure plungers, which for the purpose of length variation is assigned at least one adjusting device, can in principle also be used in the brake caliper of the disc brake described below as pertaining to the invention.

It is alternatively also possible for another type of rotary lever arrangement to be used, with an adjustment device being provided preferably only at the application side.

Sliding caliper or pivoting caliper disc brakes require an axially fixed component—generally referred to as a brake carrier—which holds and guides the brake pads/brake linings and, in the event of a brake actuation, absorbs the tangential forces. The brake carrier further supports the brake caliper, which is mounted so as to be moveable coaxially with respect to the vehicle axle. The present invention is concerned here, in particular, with the optimization of such sliding caliper disc brakes.

It is the object of the present invention to provide an optimized disc brake of the above-mentioned type.

A sliding caliper disc brake, which is further optimized in particular with regard to the installation space conditions, and preferably also with regard to its weight, should preferably be provided.

The invention provides a disc brake, in particular pneumatically or electromagnetically operated, for utility vehicles, having brake caliper which straddles a brake disc at least in a peripheral edge region, a brake application device for applying the brake, and an application-side brake lining and a reaction-side brake lining arranged on the opposite sides of a brake disc, with both brake linings each having a brake lining carrier and a lining material fitted thereto. At least the reaction-side brake lining is designed such that the brake lining carrier has at least one, or preferably a plurality of, recesses into which at least one corresponding element engages, which element is connected in one piece or is fixed to the brake caliper and projects from the latter. Alternatively or additionally, the brake lining carrier has at least one, or preferably a plurality of, projecting elements which engage in corresponding recess formed in the brake caliper. Still further alternatively or additionally, the brake lining carrier has at least one, or preferably a plurality of, recesses into which in each case at least one corresponding separate element engages, which element also engages in corresponding recess formed in the brake caliper.

A further aspect of the invention is that the brake caliper is designed as a sliding caliper which is fastened by way of a floating bearing arrangement and by a fixed bearing arrangement to an axially fixed part referred to as a brake carrier. Only one of the two bearing arrangements is divided into two individual bearings.

Another aspect of the invention is that a brake carrier has, in order to arrange the brake caliper so as to be movable relative to the brake disc plane, at the application side, in each case one bar for arranging the fixed bearing and a bar for arranging the floating bearing. These bars are connected to one another by way of a strut. Only a bar for fastening the further fixed bearing is provided on the brake carrier at the reaction side.

A brake caliper having four bearings at both sides of the brake disc is already well known from U.S. Pat. No. 4,392,560. It has, however, not been recognized that it is particularly advantageous to provide two fixed bearings and only one floating bearing, which provides considerable advantages on the caliper and the brake carrier with regard to the installation space and with regard to the brake carrier. The latter can also, in particular, be considerably optimized in terms of weight with respect to a sliding caliper design having only one fixed bearing and only one floating bearing.

Advantageous embodiments are also described and claimed herein.

The invention also provides a novel brake lining for use in the inventive disc brake.

Other objects, advantages and novel features of the present invention will become apparent from the following detailed description of the invention when considered in conjunction with the accompanying drawings.

DETAILED DESCRIPTION OF THE DRAWINGS

Figure 1:
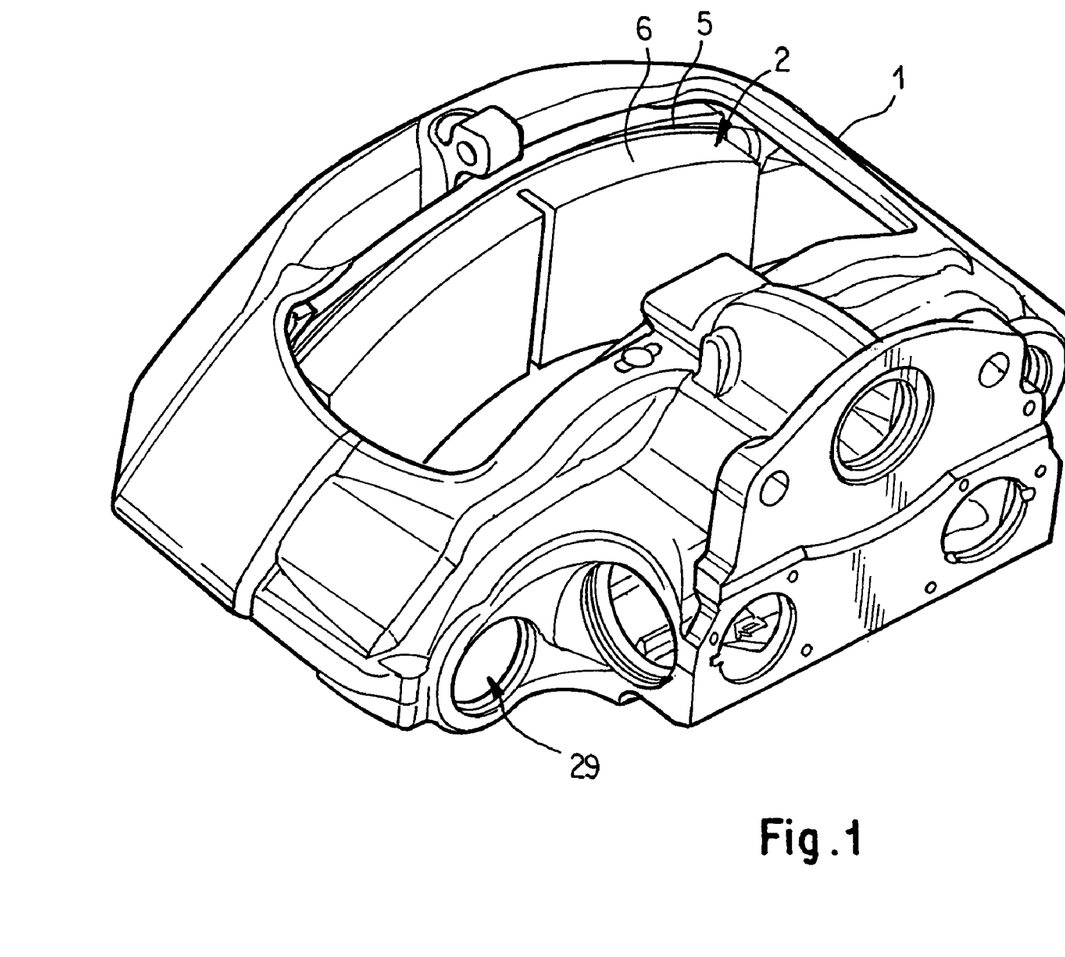
FIGS. 1-13 show different views of elements of a disc brake according to the invention.

FIG. 1 shows a brake caliper 1 for a disc brake for utility or commercial vehicles, having a reaction-side brake lining 2 and a brake carrier 3 (see FIG. 6 and FIG. 7), without illustrating the brake application device or the application-side brake lining.

The elements which are not illustrated could, for example, be designed in the manner of DE 36 10 569 A1, DE 37 16 202 A1, EP 0 531 321 A1 (having U.S. counterpart U.S. Pat. No. 5,353,896) or EP 0 688 404 A1 (having U.S. counterpart U.S. Pat. No. 5,582,273). In this respect, reference is made to the entire content of said documents, which is incorporated by reference herein. The application device is preferably assembled through an opening 4 (FIG. 2) of the brake caliper which faces toward the brake disc. An adaptation/inspection can be carried out through the smaller, further opening 9 in the lateral rear region of the caliper.

Both brake linings have a brake lining carrier plate 5 and the lining material 6 which is arranged thereon.

While the application-side brake lining can, however, fundamentally or preferably be designed in the manner of EP 0 531 321 A1 or EP 0 688 404 A1 and retained in a slot in the brake carrier 3 (see FIG. 7) by a lining holding spring in order to be fixed radially, with the brake carrier 3 having two bars or projections 7, 8 on both sides of the brake lining in order to absorb the forces acting in the tangential direction of the disc, the construction on the reaction side is different.

On the reaction side, the brake lining 5 is held directly on the brake caliper by way of at least one projection, and not on the brake carrier.

Figure 2A:
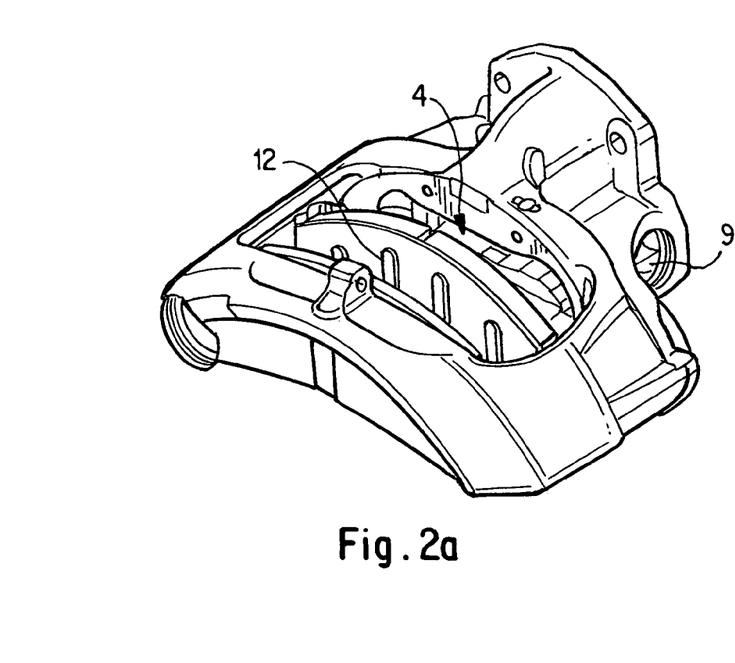
Figure 2B:
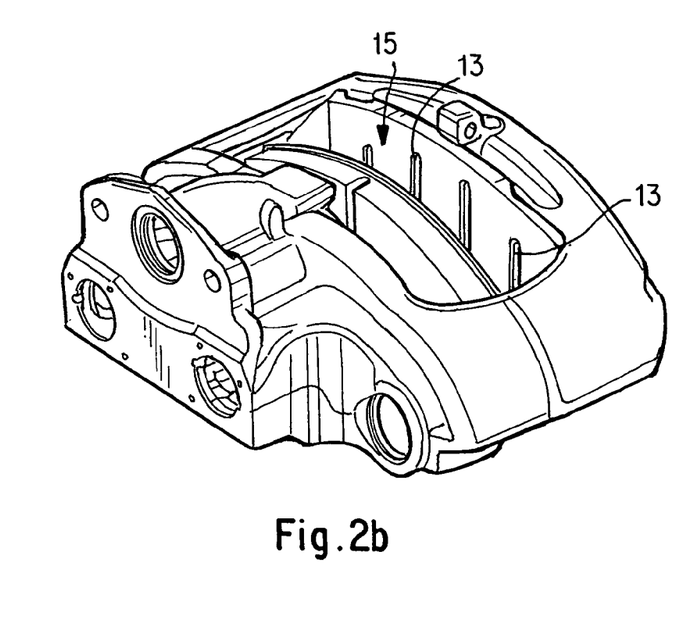
Figure 3A:
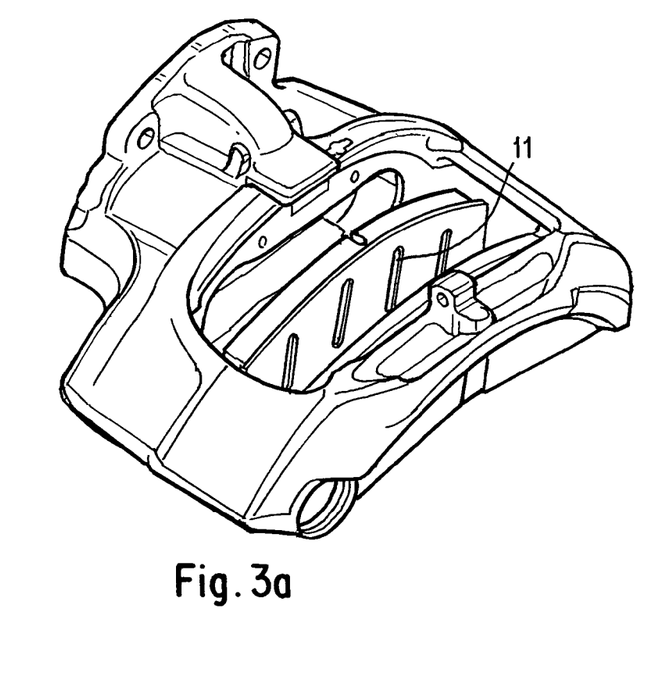
Figure 3B:
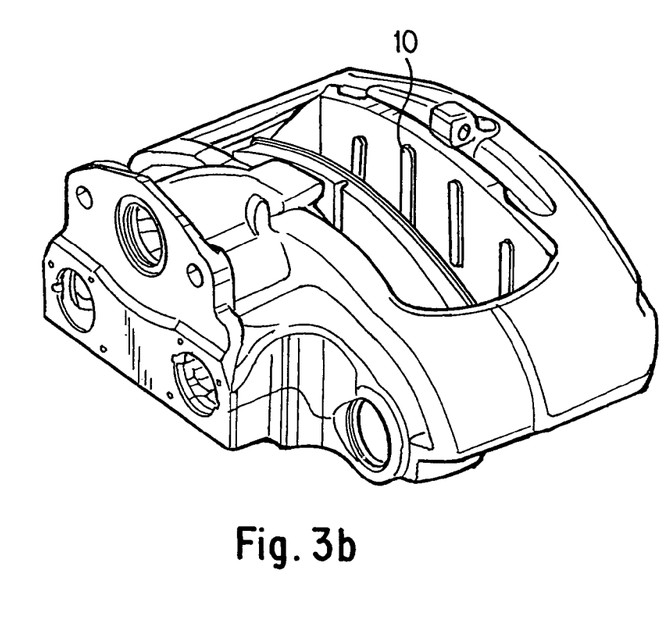
Figure 4A:
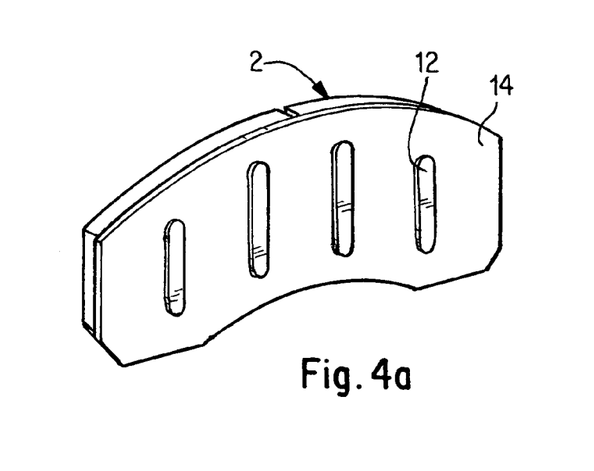
Figure 4B:
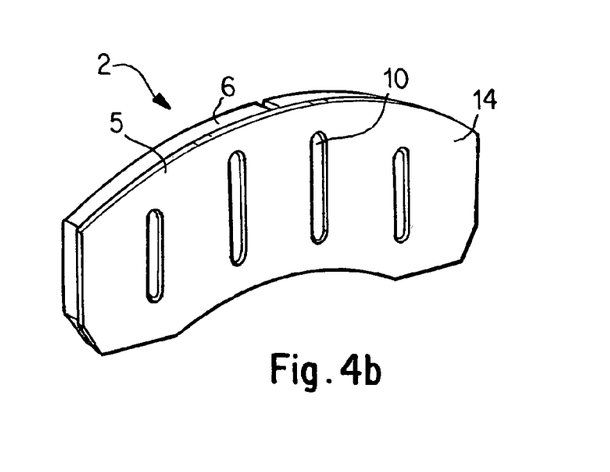
Figure 4C:
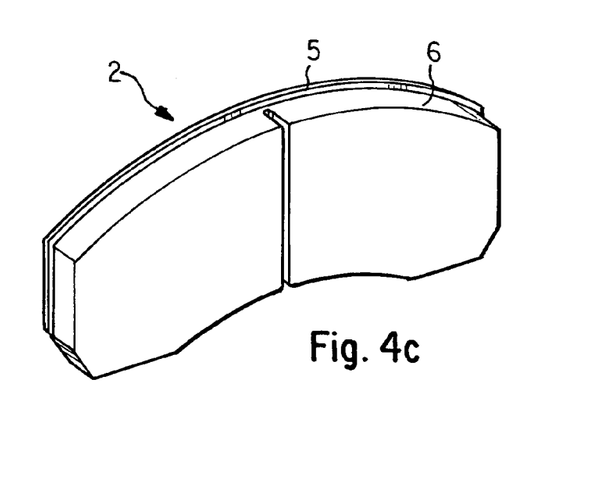
Figure 5:
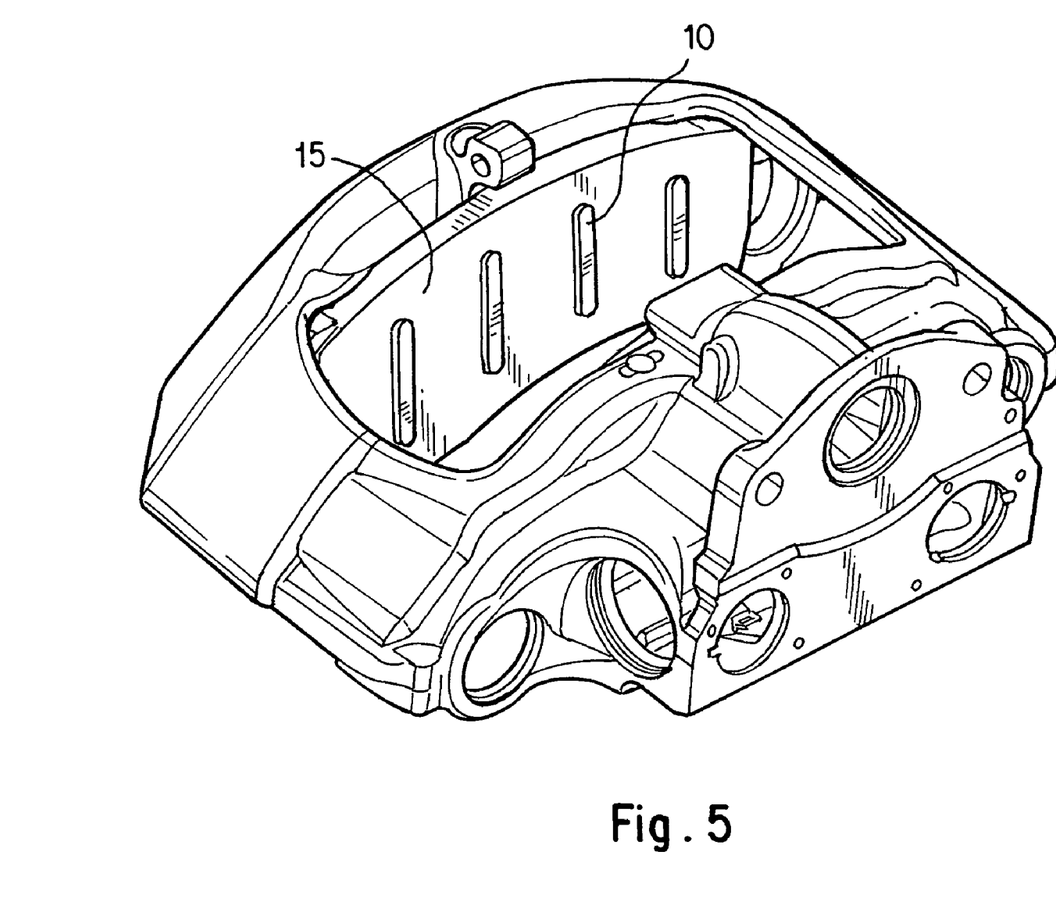

It is provided for this purpose that:
the brake lining carrier 5 has at least one, or preferably a plurality of, recesses 11 (FIG. 3a) into which at least one corresponding element 10 (FIG. 3b) engages, which element 10 is connected in one piece or is fixed to the brake caliper (1) and projects from the latter, and/or that
the brake lining carrier 5 has at least one, or preferably a plurality of, projecting elements 12 (FIG. 2a; FIG. 4a) which engages (engage) in corresponding recess(es) 13 (FIG. 2b) which are formed in the brake caliper, and/or that the brake lining carrier 5 has at least one, or preferably a plurality of, recesses 11 into which in each case at least one corresponding separate element (not illustrated here) engages, which element(s) also engages (engage) in corresponding recess(es) (13) which are formed in the brake caliper (latter variant not illustrated here).

The elements, in particular the projections 10, 12 can be of a pin-shaped and/or a strip-shaped design. A strip-shaped design is preferable. The recesses 11, 13 are of corresponding design. Here, a radial alignment is again preferable.

A plurality of strip-shaped projections/elements 10, 12 is preferably provided, which engage into corresponding groove-like recesses.

The plurality of elements and the corresponding recesses 10-13 are preferably situated parallel to one another, with the central element(s) then being aligned radially or at least approximately radially with respect to the brake disc axis.

Figure 10:
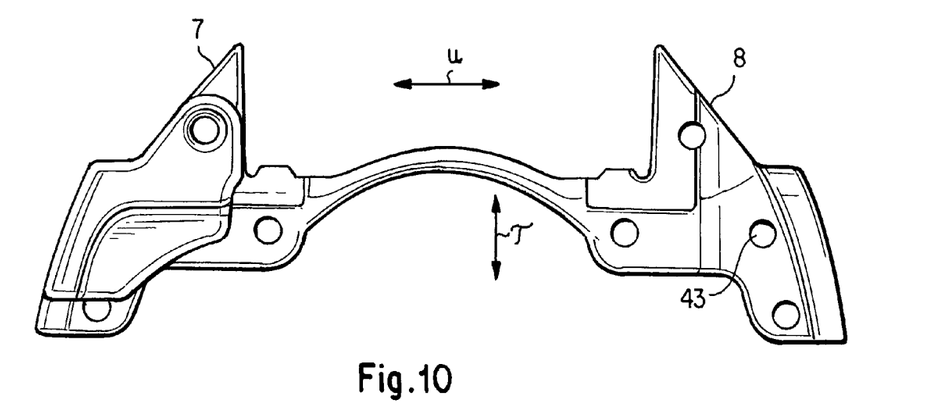
Figure 11:
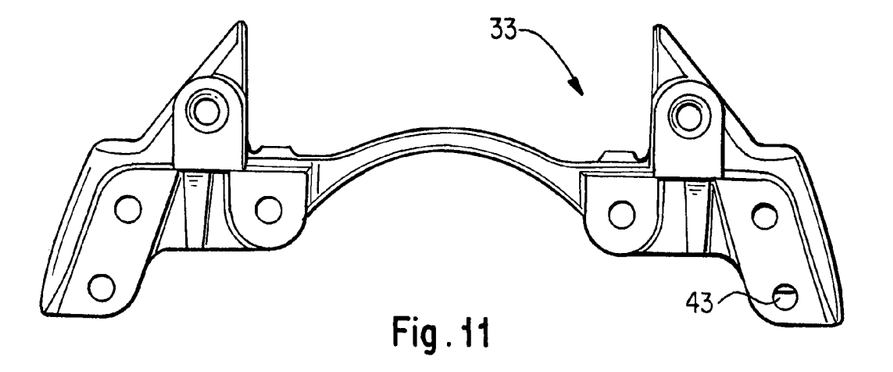

In this way, the brake lining 2 is secured in a simple manner radially—r—and in the tangential direction—u—(FIG. 10), without a holding spring being required at the reaction side. It is possible in some circumstances to dispense entirely with a brake carrier support. It is, however, preferable for support to be provided on the brake carrier at least on one side in the tangential direction.

It is advantageous that brake forces on the brake carrier in the tangential direction u are also supported by way of the recesses and elements 10-13. A torque on the disc, of such a magnitude as would occur were the application-side and reaction-side brake linings arranged offset relative to one another in the tangential direction, is thereby avoided.

With the exception of the projections and/or recesses 10-13, the contact faces 15 for the carrier plate and also the contact face 14 of the lining carrier plate are preferably of planar design.

This invention also makes it possible for the lining carrier plate to be of very thin design, around 3 mm, for example 3-5 mm thick.

Figure 12:
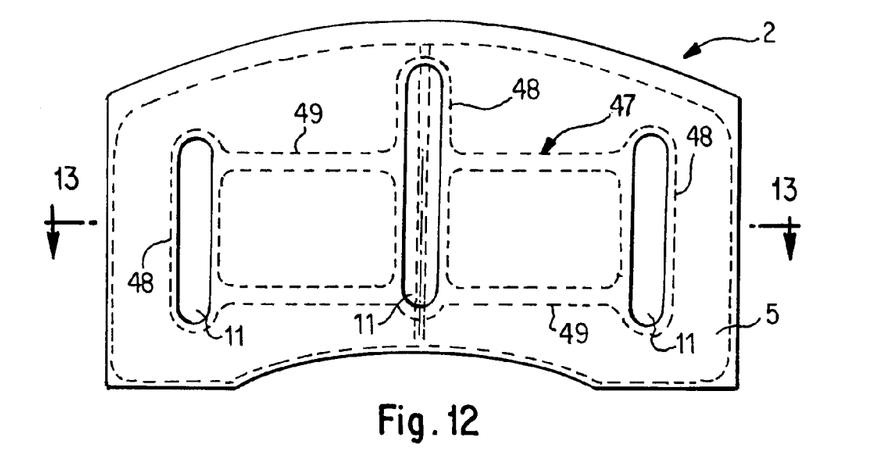
Figure 13:
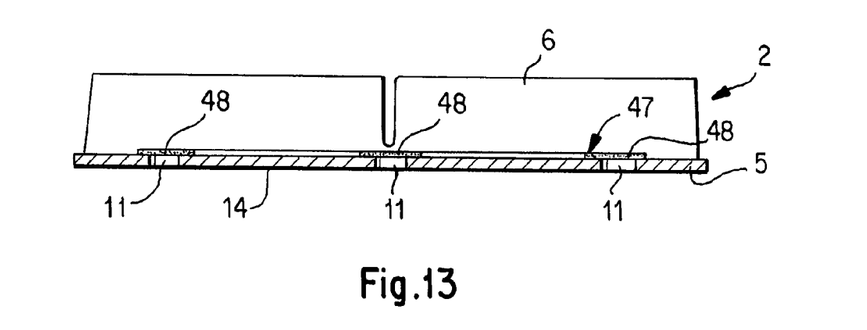

In order to ensure correct positive engagement of the projections 10 of the brake caliper 1 with the brake lining 2, that is to say for unhindered engagement of the projections 10 into the recesses 11 of the brake lining carrier, the recesses 11 are, as illustrated in FIGS. 12 and 13, closed off on the side facing away from the lining material 6 by covering strips 48, with all the covering strips 48 being connected to one another by means of struts 49, so as to form a grid-shaped covering frame 47.

The covering frame 47 is composed of a thin metal sheet and, before the application of the lining mass of the lining material 6, is positioned on the brake lining carrier 5 in such a way that the recesses 11 are completely closed off.

For this purpose, the covering strips 48, which can otherwise also be placed on individually, that is to say not in the form of a grid-shaped frame, are dimensioned so as to project in each case laterally beyond the area of the recesses 11.

The covering of the recesses 11 serves to prevent the lining mass from passing into the recesses 11 and having to be removed by means of complex processing.

The combination of the covering strips 48 to form a covering frame 47 facilitates their handling when placing them in, with the production of the covering frame 47 being very simple since the latter can be produced as a single-piece punched part.

The design of the reaction-side brake lining 2 is also to be considered as an invention in itself and suitable for the widest variety of types of disc brake constructions, that is to say, for example, also for pivoting caliper brakes or for sliding caliper brakes.

The design of the reaction-side brake lining 2 is, however, very particularly preferably used in the independently inventive design, described below, of the sliding caliper mounting on the brake carrier, which latter design can particularly advantageously complement the design of the reaction-side brake lining 2.

According to the further invention, a disc brake having a sliding caliper is provided, in which the sliding caliper 1 is fastened by way of a floating bearing arrangement 16 and a fixed bearing arrangement 17 to an axially fixed part (referred to as the brake carrier). The floating bearing arrangement 16 has a greater degree of play than the fixed bearing arrangement.

According to the invention, one of the two bearing arrangements 16, 17, in particular the fixed bearing arrangement 17, is divided into two individual fixed bearings 19, 20, whereas only a single floating bearing 22 is provided.

It is also contemplated for the floating bearing arrangement 16 to also be divided into two individual floating bearings, and then to provide only a single fixed bearing (not illustrated here). The arrangement with two fixed bearings and only a single floating bearing is, however, preferable, since the fixed bearing must generally be longer than the floating bearing, so that it is expedient to divide a longer fixed bearing into two, in each case, considerably shorter fixed bearings. A division of the floating bearing can in contrast be avoided, since the latter can already itself be of sufficiently short design.

Figure 6:
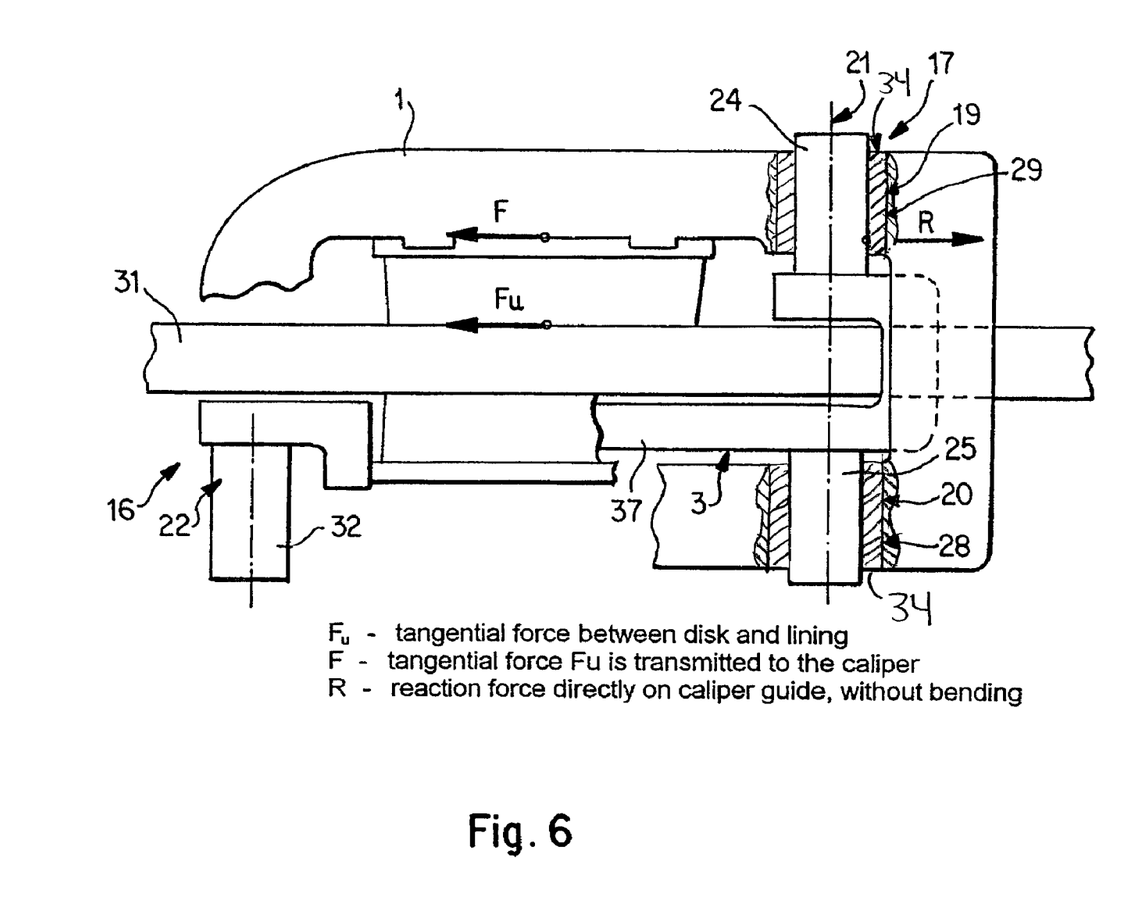

The axles of the two fixed bearings 19, 20 are preferably arranged offset relative to one another on a straight line 21 (see FIG. 6).

The fixed bearings are preferably composed in each case of pins 24, 25 which are arranged on the brake carrier 3 (for example screwed into openings 26, 27, see FIG. 7) and then extend through corresponding bearing openings, in particular bores 28, 29 in the brake caliper 1. One or more sleeves 34 can be arranged between the pins 24, 25 and the bores 28, 29. Various embodiments are known from the prior art for this purpose. The degree of play of the fixed bearing is less than that of the floating bearing.

As a result of the division, two individually short fixed bearings 19, 20 are provided, whose properties are similar to those of a single corresponding long fixed bearing (that is to say, a bearing which extends from one of the bearings to the other) without requiring the installation of the long bearing. If an arrangement of this type is realized, it is possible for installation space to be saved, because the two fixed bearings are shorter than a long fixed bearing would have to be on one side of the brake disc, and nevertheless advantageously only a single, preferably application-side (with respect to the central plane 30 of the brake disc 31) floating bearing is used, of which FIG. 6 depicts only the pin 32.

As a result of the selected construction in connection, in particular, with the brake lining according to the invention, a further option can be realized, which again constitutes an invention in itself but can be combined with the two above inventions.

Figure 7:
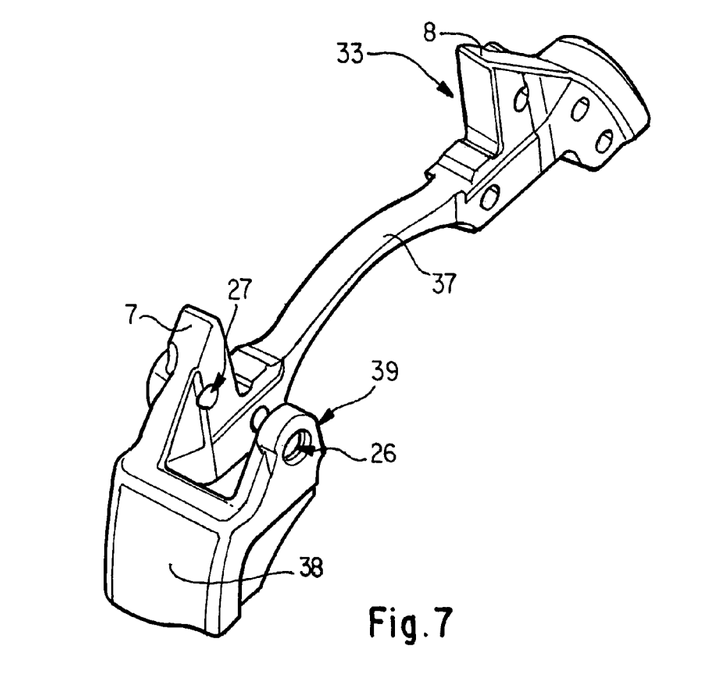

According thereto, as per FIG. 7 et seq., the brake carrier is designed so as to form a lining slot 33 at the application side, on which lining slot 33 the application-side brake lining is supported in both tangential directions U on projections or bars 7, 8, which are connected to one another by means of a strut 37.

A support face of this type is no longer required on the reaction side, however. The brake carrier 3 therefore extends, proceeding from the application side, axially to the reaction side with only a short axial shoulder 38, which serves to realize the reaction-side fixed bearing.

Figure 8:
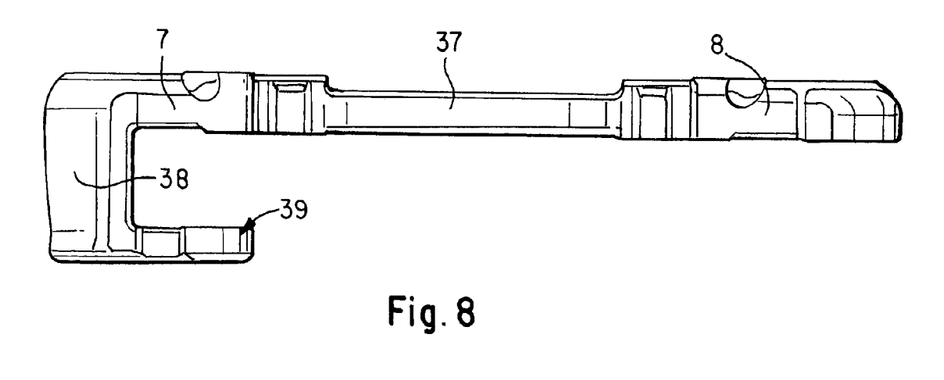

In the plan view of FIG. 8, the brake carrier is substantially L-shaped. Here, the brake carrier has, at the application side, the strut 37 which, in the assembly position (see also FIG. 6) extends parallel to the brake disc 31 at the application side. Proceeding from one end of the strut 37, the projection 38 then extends axially adjacent to the brake disc 31 to the reaction side. The shoulder 38 is again designed so as to be angled in on itself and forms a bar 39, which extends parallel to the brake disc, for fastening the reaction-side fixed bearing.

Figure 9:
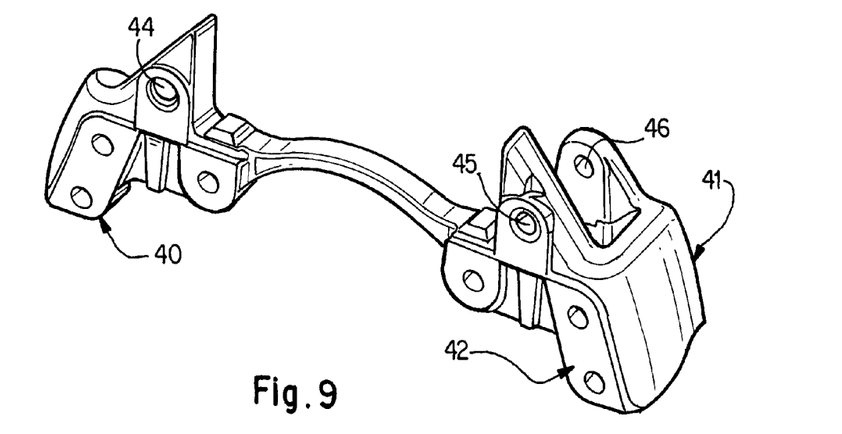

In each case, three assembly regions 40, 41, 42 for simple and nevertheless secure assembly of the brake carrier on an axle flange or the like are provided in the lower region below the three bars 7, 8, 39 in the alignment of FIG. 9 (toward the axle in the installed position). It is in turn possible in each case for a plurality of openings 43 for fastening by way of pins to the axle flange to be provided in the three assembly regions 40-42.

The three openings 44-46 for receiving the pins for the fixed and floating bearings are formed in the region facing toward the brake caliper.

The brake carrier 3, which is designed in this way, is particularly light since it does not require four bars and two struts, but rather only one strut and three bars. It is also optimized with regard to installation space.

| Table of Reference Numbers | |
|---|---|
| Brake caliper | 1 |
| Brake lining | 2 |
| Brake carrier | 3 |
| Opening | 4 |
| Brake lining carrier plate | 5 |
| Lining material | 6 |
| Projections | 7, 8 |
| Openings | 9 |
| Projections | 10, 12 |
| Recesses | 11, 13 |
| Contact faces | 14, 15 |
| Bearing arrangements | 16, 17 |
| Fixed bearings | 19, 20 |
| Straight line | 21 |
| Floating bearing | 22 |
| Pins | 24, 25 |
| Openings | 26, 27 |
| Bores | 28, 29 |
| Central plane | 30 |
| Brake disc | 31 |
| Pin | 32 |
| Lining slot | 33 |
| Strut | 37 |
| Shoulder | 38 |
| Bar | 39 |
| Assembly regions | 40, 41, 42 |
| Openings | 43 |
| Openings | 44-46 |
| Covering frame | 47 |
| Covering strip | 48 |
| Strut | 49 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a utility vehicle, comprising:
 a caliper which straddles a brake disc at least in a peripheral edge region thereof when in use;
 a brake application device for applying the disc brake;
 an application-side brake lining and a reaction-side brake lining respectively arranged on opposite sides of the brake disc when in use, each lining having a lining carrier plate and a lining material arranged on the carrier plate;
 wherein the reaction-side brake lining is operatively configured such that, on a side of the lining carrier plate away from the lining material, the only features arranged to be used as brake lining retaining features for retaining the brake lining in the brake caliper are configured in at least one of the following ways:
 a) the lining carrier plate has one or more through recesses into which one or more corresponding elements engage, said one or more elements being in one piece with or fixed to the caliper and projecting from the caliper toward the lining carrier plate;
 b) the lining carrier plate has one or more through recesses into which one or more corresponding separate elements engage, said elements also engaging in corresponding recesses formed in the caliper, and wherein each of the one or more recesses are covered by covering strip applied to a side of the lining carrier plate which receives the lining material prior to application of the lining material and, when more than one recess is present, each covering strip is connected to another covering strip by at least one strut to form a covering frame.

2. The disc brake as claimed in claim 1, wherein the elements have a strip-shaped design.

3. The disc brake as claimed in claim 1, wherein the one or more elements are formed parallel to one another.

4. The disc brake as claimed in claim 1, wherein the elements are aligned radially with respect to the brake disc.

5. The disc brake as claimed in claim 1, wherein the projections are of at least one of a pin-shaped and a strip-shaped design, and the corresponding recesses are of a channel-shaped/groove-shaped design.

6. The disc brake as claimed in claim 1, wherein contact faces between the brake caliper and the brake lining carrier plate are of a planar design except for the elements and recesses.

7. The disc brake as claimed in claim 1, wherein the brake lining carrier plate is 3-5 mm thick in an axial direction with respect to the brake disc.

8. A disc brake for a utility vehicle, comprising:
    a caliper which straddles a brake disc at least in a peripheral edge region thereof when in use;
    a brake application device for applying the brake;
    an application-side brake lining and a reaction-side brake lining respectively arranged on opposite sides of the brake disc when in use, each brake lining having a lining carrier plate and a lining material arranged on the lining carrier plate; and
    wherein the caliper is a sliding caliper fastenable via a floating bearing arrangement and a fixed bearing arrangement to an axially fixed component;
    wherein only one of the two bearing arrangements is divided into two individual bearings, the undivided bearing does not extend over the brake disc,
    at least the reaction side brake lining is not supported directly on either or both of the bearings, and is operatively configured such that the only features on a side of the lining carrier plate away from the lining material arranged to be used as brake lining retaining features for retaining the brake lining in the brake caliper are configured in at least one of the following ways:
        a) the lining carrier plate has one or more through recesses into which one or more corresponding elements engage, said one or more elements being in one piece with or fixed to the caliper and projecting from the caliper toward the lining carrier plate;
        b) the lining carrier plate has one or more through recesses into which one or more corresponding separate elements engage, said elements also engaging in corresponding recesses formed in the caliper, and
    wherein each of the one or more recesses are covered by covering strip applied to a side of the lining carrier plate which receives the lining material prior to application of the lining material and, when more than one recess is present, each covering strip is connected to another covering strip by at least one strut to form a covering frame.

9. The disc brake as claimed in claim 8, wherein the fixed bearing arrangement is divided into two fixed bearings, and only a single floating bearing is provided, the floating bearing having a greater degree of play than the two fixed bearings.

10. The disc brake as claimed in claim 9, wherein one of the two fixed bearings is arranged at an application side of the disc brake, and the other fixed bearing is arranged at a reaction side.

11. The disc brake as claimed in claim 10, wherein the floating bearing is arranged at an application side of the disc brake.

12. The disc brake as claimed in claim 9, wherein axles of the two fixed bearings are arranged offset relative to one another on a straight line.

13. The disc brake as claimed in claim 9, wherein at least one of the fixed bearings and the floating bearing, in each case, have pins which are arranged on a brake carrier forming the axially fixed component and are screwed into openings of the brake carrier, and corresponding bearing openings in the form of bores extending through the brake caliper and into which the pins engage, one or more bearing sleeves being arrangeable between the pins and the bores.

14. A brake carrier for a movable caliper disc brake having a caliper straddling a brake disc at least in a peripheral edge region thereof when in use, a brake application device for applying the disc brake, and an application-side brake lining and a reaction-side brake lining, each brake lining having a lining carrier plate and a lining material arranged on the carrier plate, the brake carrier comprising:
    first and second bars on an application-side of the carrier with respect to the brake disc, the first bar being operatively configured to support a fixed bearing for the caliper, and the second bar being operatively configured to support a floating bearing for the caliper and neither the first nor second bar being arranged to extend over the brake disc when located in the movable caliper disc brake;
    a strut operatively configured to connect the first and second bars to one another; and
    only one further bar operatively configured on the reaction-side relative to the disc brake, said further bar fastening a further fixed bearing for the caliper.

15. The disc brake as claimed in claim 14, wherein the first and second application-side bars form a lining carrier slot for the application-side brake lining.

16. The disc brake as claimed in claim 15, wherein no brake lining retainer is formed on the brake carrier at the reaction side.

17. The disc brake as claimed in claim 16, wherein the brake carrier has a substantially L-shape in a plan view.

18. The disc brake as claimed in claim 17, further comprising a shoulder extending from the strut, axially adjacent to the brake disc, to the reaction side of the brake disc, said shoulder being designed to angle back in order to extend so as to form the one further bar for fastening the reaction-side fixed bearing in a manner of a shoulder parallel to the brake disc at the reaction side.

19. The disc brake as claimed in claim 14, wherein the brake carrier has, in a region alignable toward the wheel axle, three assembly regions designed for fastening to an axially fixed part.

20. A brake lining for a disc brake having a caliper which, in use, straddles at least a peripheral edge region of a brake disc, the brake lining comprising:
    a lining carrier plate operatively configured such that, on a side of the lining carrier plate away from the lining material, the only features arranged to be used as brake lining retaining features for retaining the brake lining in the brake caliper are configured in one of the following ways:

a) the lining carrier plate has one or more through recesses into which one or more corresponding elements engage, said one or more elements being in one piece with or fixed to the caliper and projecting from the caliper toward the lining carrier plate; and b) the lining carrier plate has one or more through recesses into which one or more corresponding separate elements engage, said elements also engaging in corresponding recesses formed in the caliper, wherein each of the one or more recesses are covered by covering strip applied to a side of the lining carrier plate which receives the lining material prior to application of the lining material and, when more than one recess is present, each covering strip is connected to another covering strip by at least one strut to form a covering frame.

21. The brake lining as claimed in claim 20, wherein each covering strip which covers a recess projects laterally beyond the associated recess.

22. The brake lining as claimed in claim 20, wherein the covering frame is of a grid-shaped design.

23. The brake lining as claimed in claim 20, wherein the covering strip and the covering frame are composed of sheet metal.

24. The brake lining as claimed in claim 20, wherein the covering frame is formed as a punched part.

* * * * *